United States Patent
Lawlyes et al.

(10) Patent No.: US 6,308,725 B1
(45) Date of Patent: Oct. 30, 2001

(54) APPARATUS FOR CONTROLLING HYDRAULIC FLUID PRESSURE

(75) Inventors: Daniel Alan Lawlyes, Kokomo, IN (US); Duane Zedric Collins, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/480,354

(22) Filed: Jun. 10, 2000

(51) Int. Cl.$^7$ .................................................. G05D 16/20
(52) U.S. Cl. ........................ 137/14; 137/487.5; 137/557
(58) Field of Search .................... 137/14, 487.5, 137/557

(56) References Cited

U.S. PATENT DOCUMENTS

| | | | |
|---|---|---|---|
| 4,796,661 | * | 1/1989 | Hishinuma et al. ............... 137/487.5 |
| 5,404,301 | * | 4/1995 | Slicker ............................. 364/424.1 |
| 5,707,039 | * | 1/1998 | Hamilton et al. ............... 251/129.17 |
| 5,836,347 | * | 11/1998 | Harries ............................... 137/487.5 |
| 6,003,543 | * | 12/1999 | Sulatisky et al. ................ 137/487.5 |
| 6,116,269 | * | 9/2000 | Maxson ............................... 137/557 |

* cited by examiner

Primary Examiner—Michael Powell Buiz
Assistant Examiner—Ramesh Krishnamurthy
(74) Attorney, Agent, or Firm—Jimmy L. Funke

(57) ABSTRACT

A smart actuator (10), includes a mounting base (12), a solenoid element (14), and a pressure sensor element (16). The solenoid element (14) and the pressure sensor element (16) are in electrical communication with a remote control element (17) through a wire harness (18). The remote control element (17) sends a signal to the solenoid element (14) to adjust hydraulic fluid pressure. The pressure sensor (16) reports back to the remote control element (17) the value of hydraulic fluid pressure such that a closed-loop system in formed where correct hydraulic fluid pressure is rapidly and accurately attained.

19 Claims, 1 Drawing Sheet

APPARATUS FOR CONTROLLING HYDRAULIC FLUID PRESSURE

TECHNICAL FIELD

The present invention relates generally to improvements to an actuator design and more particularly to improvements in an actuator design for use in automotive hydraulic fluid applications.

BACKGROUND ART

Hydraulic fluid applications are well known in the automotive industry. Two well known hydraulic fluid applications are automotive transmission systems and automotive braking systems. The pressure of the hydraulic fluid in such systems is commonly controlled and varied through the use of actuators. Hydraulic fluid pressure is known to be a vital element in the proper performance of such systems.

In an automotive automatic transmission system, electronic transmission controls are commonly used to control the pressure of the hydraulic fluid line. The pressure of the hydraulic fluid line can be used to control various elements of the automatic transmission system including the engagement of individual planetary gears. By engaging various combinations of planetary gears, an automatic transmission system accomplishes the same task as the shifting of gears in a manual transmission. Therefore, it is common within the art to refer to changes in the status of the planetary gear system as shifting gears or shift points even though the mechanisms are not commonly the same as those found in manual transmissions. It is known that the pressure of the hydraulic fluid line in automatic transmission systems can be used to control the shift points.

Known electronic automatic transmission systems often control the shift points based upon various factors including engine RPM, engine torque and vehicle speed. The electronic control unit (ECU) in these systems use the data from these factors to determine an optimal hydraulic fluid line pressure. Once the optimal hydraulic fluid line pressure is determined by the ECU, look-up tables within the ECU are accessed to determine the correct level of current to send to the actuator controlling the hydraulic fluid line pressure. These systems continue to monitor the data factors as well as the shift timing to determine if the correct hydraulic line pressure was achieved. If the data relayed to the ECU indicated that the correct hydraulic line pressure was not achieved, a new value is looked up in the tables and an "adapt" is recorded such that future adjustments are expedited. This system must continually zero in on the actual line pressure value, as it does not provide any way of monitoring the line pressure directly. This process of continually making adjustments is inefficient, may have a negative effect on the shift-feel quality of the transmission system and can have a negative effect on the fuel economy of the automobile.

In addition, it is known that in some existing systems, the "adapts" may not exceed 10 psi and therefore require the transmission to be occasionally recalibrated. Such a system is highly undesirable and can lead to customer dissatisfaction. It would therefore be desirable to have a transmission control system that would quickly, efficiently and consistently set the hydraulic fluid line to the correct pressure and thereby provide improved shift-feel quality and improved fuel economy and would minimize service requirements.

It is known that a similar system of hydraulic fluid line pressure control is utilized in some modern braking systems. These braking system use a traction control module (TCM) to adjust the brake fluid line pressure based upon various sensors that provide data relating to driving conditions. These braking systems do not monitor the actual pressure within the brake fluid line but rather provide approximations from look-up tables and continual adjustments to zero in on the actual line pressure value. Therefore, these systems share the same inefficiencies found in the above described automotive transmission systems.

Therefore, there is a need for an actuator that can quickly, accurately, and consistently set the line pressure in a hydraulic fluid line without the inefficiencies and maintenance requirements of known designs.

SUMMARY OF THE INVENTION

It is therefore an object of the present invention to provide a smart actuator for use in hydraulic fluid systems that quickly, accurately, and consistently sets the line pressure in the hydraulic fluid line without the inefficiencies and maintenance requirements of known designs.

In accordance with the objects of this invention, a smart actuator is provided. The smart actuator includes a mounting base, a solenoid element and a pressure sensor element. The solenoid element and the pressure sensor element are attached to the single mounting base to create a smart actuator with a small profile that can be positioned within the small spaces often encountered in modern design requirements.

The smart actuator's solenoid element is in fluid communication with a hydraulic fluid line. The solenoid element is further in electrical communication with a remote control element. The control element sends electrical signals to the solenoid element to vary the pressure of the hydraulic fluid line.

The smart actuator's pressure sensor element is also in fluid communication with the hydraulic fluid line. The sensor element monitors the pressure of the hydraulic fluid line at a position located at the output of the solenoid element. The pressure sensor element is further in electrical communication with the remote control element. The pressure sensor element sends electrical signals to the remote control element to relay the actual pressure in the hydraulic fluid line. By relaying the actual pressure of the solenoid output to the remote control element, the solenoid element can be controlled to quickly and accurately bring the pressure of the hydraulic fluid line to the desired level.

A single wire harness is used to provide the electrical communication path between the remote control element to the solenoid element and the electrical communication path between the pressure sensor element and the remote control element. This provides additional space saving characteristics to the smart actuator.

Other objects and features of the present invention will become apparent when viewed in light of the detailed description of the preferred embodiment when taken in conjunction with the attached drawings and appended claims.

DESCRIPTION OF THE PREFERRED EMBODIMENT(S)

Figure 1:
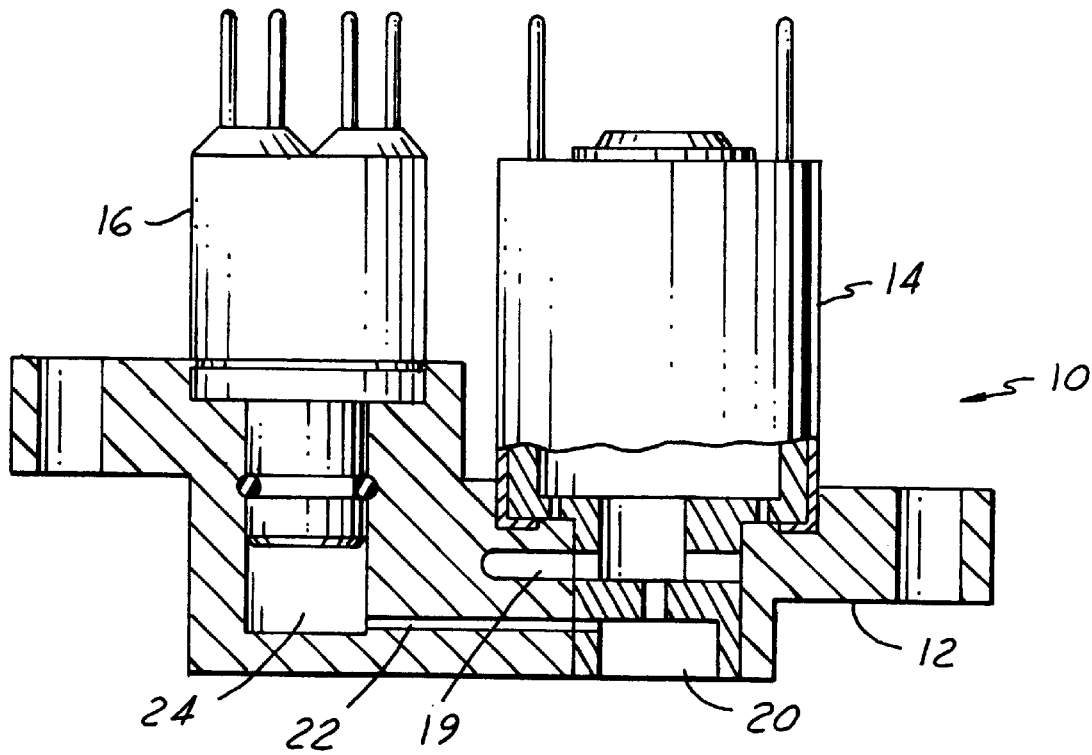
FIG. 1 is a cross-sectional view of smart actuator in accordance with the present invention.

Referring now to FIG. 1, which is a cross-sectional view of a smart actuator 10 in accordance with the present invention. The disclosed smart actuator 10 is preferably for use in automotive electronic transmission systems. However, the disclosed smart actuator 10 may be used in a variety of applications, including automotive braking systems and even non-automotive applications.

The smart actuator 10 includes a mounting base 12. The mounting base 12 houses a solenoid element 14 and a pressure sensor element 16. By mounting the solenoid element 14 and the pressure sensor element 16 on a single mounting base 12, the profile of the smart actuator 10 is minimized. Minimizing the profile of the smart actuator 10 makes it highly suitable for use in automotive applications where minimization of part size is often a high priority.

The small profile of the smart actuator 10 allows it to be positioned in close proximity to the location that the control of fluid pressure is needed. This allows the changes in fluid pressure made by the smart actuator 10 to have a rapid effect on a system in which the smart actuator 10 is implemented. In the case of an automotive automatic transmission system, this allows faster change in the fluid pressure of the hydraulic pressure line controlling the transmission. This decrease in system response time can assist in faster and smoother transmission shifts.

Figure 2:
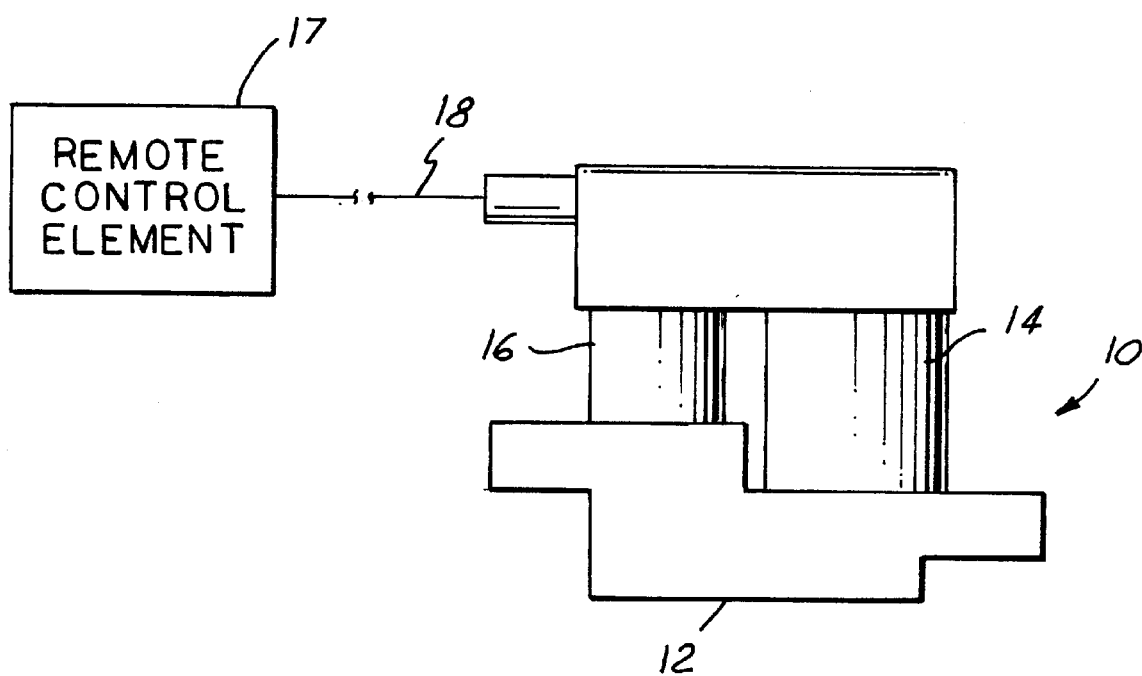
FIG. 2 is an illustration of a smart actuator in accordance with the present invention.

The smart actuator 10 utilizes the solenoid element 14 to adjust the pressure of the hydraulic fluid. A remote control element 17 positioned remotely from the smart actuator 10 and connected to the smart actuator by a wire harness 18 is preferably used to determine the desired pressure of the hydraulic fluid (see FIG. 2). In an automotive automatic transmission system, the desired pressure may be based upon a variety of factors such as engine rpm, vehicle speed and other driving conditions. The remote control element 17 may be a transmission control module (TCM) or an electronic control unit (ECU) although other controlling devices may be used. In other applications, such as braking systems other known controlling units may be utilized.

Once the remote control element 17 determines the proper hydraulic fluid pressure, it sends a signal through the wire harness 18 to the solenoid element 14. The solenoid element 14 responds to the signal by increasing or decreasing the pressure of the hydraulic fluid as indicated by the signal. In one embodiment, the solenoid element 14 is a pulse-width modulated (PWM) solenoid and the remote control element 17 controls the solenoid element 14 by varying the voltage duty cycle. In another embodiment, the solenoid element 14 is a variable bleed solenoid (VBS) and the remote control element 17 controls the solenoid element 14 by varying the current. Although these two embodiments of a solenoid element 14 are described, there are a variety of other embodiments that may be used.

When the solenoid element 14 is activated from a signal from the remote control element 17, the solenoid element 14 forces hydraulic fluid from a fluid inlet 19 to a fluid outlet 20. As the solenoid element 14 moves the hydraulic fluid, it is known that the solenoid element 14 can adjust the pressure of the hydraulic fluid. A pressure channel 22 allows portions of fluid from the fluid outlet 20 into communication with a pressure chamber 24. The pressure sensor 16 is positioned in fluid communication with the pressure chamber 24 such that the pressure of the fluid at the fluid outlet 20 is monitored. Although it is preferable to monitor the pressure of the fluid at the fluid outlet 20 to optimize system response, the pressure may be measured at other locations on the hydraulic fluid line. In addition, although one configuration of fluid communication is shown in FIG. 1, other configurations are possible.

The pressure sensor element 16 monitors the pressure of the hydraulic fluid at the fluid outlet 20 and sends a signal through the wire harness 18 to the remote control element 17 reporting that pressure. This provides a closed-loop system in which the remote control element 17 sends a signal to the solenoid element 14 to adjust the hydraulic fluid pressure and the pressure sensor element 16 reports back the status of the hydraulic fluid pressure. Using this closed loop system, the desired hydraulic fluid pressure is rapidly and accurately reached. When used in automotive automatic transmission systems, this rapid and accurate pressure control results in improved shift-feel quality due to rapid system response and improved fuel economy due to optimization of shift points. In addition, the need for look-up tables, used in some known systems, is eliminated which can result in increased cost savings. When used in braking systems, such as anti-lock braking systems, the rapid and accurate response can result in improved consumer brake-petal feel and improved braking response.

While particular embodiments of the invention have been shown and described, numerous variations and alternate embodiments will occur to those skilled in the art. Accordingly, it is intended that the invention be limited only in terms of the appended claims.

What is claimed is:

1. An apparatus having a fluid inlet and a fluid outlet for controlling hydraulic fluid pressure comprising:

a mounting base;

a solenoid element, attached to said mounting base and in fluid communication with a hydraulic fluid line, said solenoid element being capable of increasing and decreasing fluid pressure within said hydraulic fluid line;

a pressure sensor element attached to said mounting base and in fluid communication with said hydraulic fluid line, said pressure sensor element positioned in fluid communication with a pressure chamber, said chamber located directly at said outlet of said apparatus, said pressure sensor element being capable of monitoring said fluid pressure; and a remote control element, said remote control element, through communication with said pressure sensor element, determines the line pressure of said hydraulic fluid line, and the line pressure of said hydraulic fluid line is adjusted by said remote control element through communication with said solenoid element.

2. An apparatus for controlling hydraulic fluid pressure as described in claim 1, further comprising:

a wire harness providing electrical communication between said remote control element and said solenoid element and said pressure sensor element.

3. An apparatus for controlling hydraulic fluid pressure as described in claim 1, wherein said solenoid element comprises a pulse width modulated solenoid.

4. An apparatus for controlling hydraulic fluid pressure as described in claim 1, wherein said solenoid element comprises a variable bleed solenoid.

5. An apparatus for controlling hydraulic fluid pressure as described in claim 1 for use in an automotive transmission system.

6. An apparatus for controlling hydraulic fluid pressure as described in claim 1, wherein said remote control element comprises an automotive electronic control system.

7. An apparatus for controlling hydraulic fluid pressure as described in claim 1, wherein said remote control element comprises a transmission control module.

8. An apparatus for controlling hydraulic fluid pressure as described in claim 1 for use in an automotive braking system.

9. An apparatus having a fluid inlet and a fluid outlet for controlling hydraulic fluid pressure comprising:

a mounting base;

a solenoid element, attached to said mounting base and in fluid communication with a hydraulic fluid line, said solenoid element being capable of increasing and decreasing fluid pressure within said hydraulic fluid line;

a pressure sensor element attached to said mounting base and in fluid communication with said hydraulic fluid line at a position located directly at the outlet of said apparatus, said pressure sensor element being capable of monitoring said fluid pressure;

a remote control element, said remote control element, through communication with said pressure sensor element, determines the line pressure of said hydraulic fluid line, and the line pressure of said hydraulic fluid line is adjusted by said remote control element through communication with said solenoid element; and a wire harness providing electrical communication providing electrical communication between said remote control element and said solenoid element and said pressure sensor element.

10. An apparatus for controlling hydraulic fluid pressure as described in claim 9, wherein said solenoid element comprises a pulse width modulated solenoid.

11. An apparatus for controlling hydraulic fluid pressure as described in claim 9, wherein said solenoid element comprises a variable bleed solenoid.

12. An apparatus for controlling hydraulic fluid pressure as described in claim 9 for use in an automotive transmission system.

13. An apparatus for controlling hydraulic fluid pressure as described in claim 9, wherein said remote control element comprises an automotive electronic control system.

14. An apparatus for controlling hydraulic fluid pressure as described in claim 9 for use in an automotive braking system.

15. A method of controlling pressure in a hydraulic fluid line comprising the steps of:

sending a signal from a remote control system to a solenoid element, said solenoid element placed in an apparatus having an inlet and an output;

adjusting the pressure of the hydraulic fluid line using said solenoid element;

monitoring the pressure of the hydraulic fluid line at a position directly adjacent to said outlet;

reporting the pressure of the hydraulic fluid to said remote control system; and using the pressure of the hydraulic fluid line to adjust said signal from said remote control system to said solenoid element such that the pressure of the hydraulic fluid line can be controlled quickly and accurately.

16. A method of controlling pressure in a hydraulic fluid line as described in claim 15, wherein said solenoid element comprises a pulse width modulated solenoid.

17. A method of controlling pressure in a hydraulic fluid line as described in claim 15, wherein said solenoid element comprises a variable bleed solenoid.

18. A method of controlling pressure in a hydraulic fluid line as described in claim 15 for use in an automotive transmission system.

19. A method of controlling pressure in a hydraulic fluid line as described in claim 15 for use in an automotive braking system.

* * * * *